March 2, 1965  C. H. W. CARTE  3,171,684
SEATS

Filed July 19, 1961  4 Sheets-Sheet 1

INVENTOR.
CECIL HENRY WALTER CARTE
By Mason, Nolte & Nolte
ATTORNEYS

March 2, 1965 C. H. W. CARTE 3,171,684
SEATS

Filed July 19, 1961 4 Sheets-Sheet 3

INVENTOR.
CECIL HENRY WALTER CARTE
By Mosca, Nolte & Nolte
ATTORNEYS

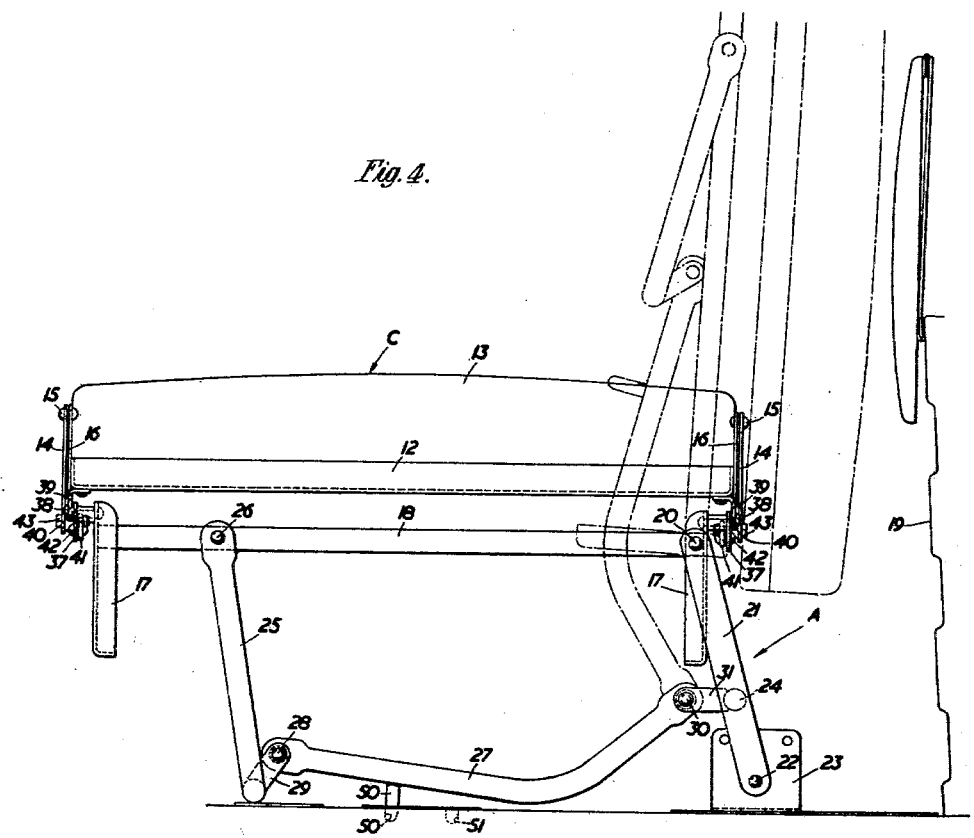

United States Patent Office 3,171,684
Patented Mar. 2, 1965

3,171,684
SEATS
Cecil Henry Walter Carte, Folkestone, Kent, England, assignor to Martin Walter Limited, Folkestone, Kent, England
Filed July 19, 1961, Ser. No. 125,209
Claims priority, application Great Britain, Aug. 10, 1960, 27,693/60
6 Claims. (Cl. 297—65)

This invention relates to seat units, more particularly for use in motor vehicles, of the type comprising a base frame, a seat frame and a back frame both mounted on the base frame and linkages whereby the seat frame and back frame may be moved in relation to the base frame from a seating position in which they collectively form a seat to a flat position in which they are aligned and extend substantially horizontally to enable the seat unit to be used as a bed or settee.

The invention provides a seat unit of this type in which the seat frame and back frame are connected together and to the base frame at each side of the seat unit by a linkage comprising a pivot connecting the lower end of the back frame to the rear end of the seat frame, a first link pivoted at its lower end to the base frame and at its upper end to the rear of the back frame, a second link pivoted at its forward end to the seat frame and at its rear end to a point intermediate in the length of the first link and a connection between the forward end of the seat frame and the base frame for guiding the seat frame in its movement in relation to the base frame and permitting the seat frame to move forwardly in relation to the base frame as the seat and back frames are moved to the flat position.

This connection is preferably a link pivoted at its lower end to the base frame and at its upper end to the seat frame. It may, however, be constituted by a pin on the seat frame engaging a slot in the base frame.

The invention further provides a seat unit of the aforesaid type wherein said base frame includes an upper member supporting said linkage means, an arm located adjacent a wall of the vehicle and pivoted at its upper end to said upper member and at its lower end to the floor, a leg spaced inwardly from said arm, said leg being pivoted at its upper end to said upper member and resting at its lower end on the floor, a link extending transversely of said vehicle and pivoted at its opposite ends to said arm and said leg and a pin extending downwardly from said link, said floor having sockets spaced at different distances from said wall and alternatively engageable by said pin to locate said seat unit in different laterally spaced positions in the vehicle.

One embodiment of the invention will now be described in more detail, by way of example, with reference to the accompanying drawings in which:

FIGS. 3 and 4 are rear elevations, showing the seat unit in alternative positions.

Figure 1:
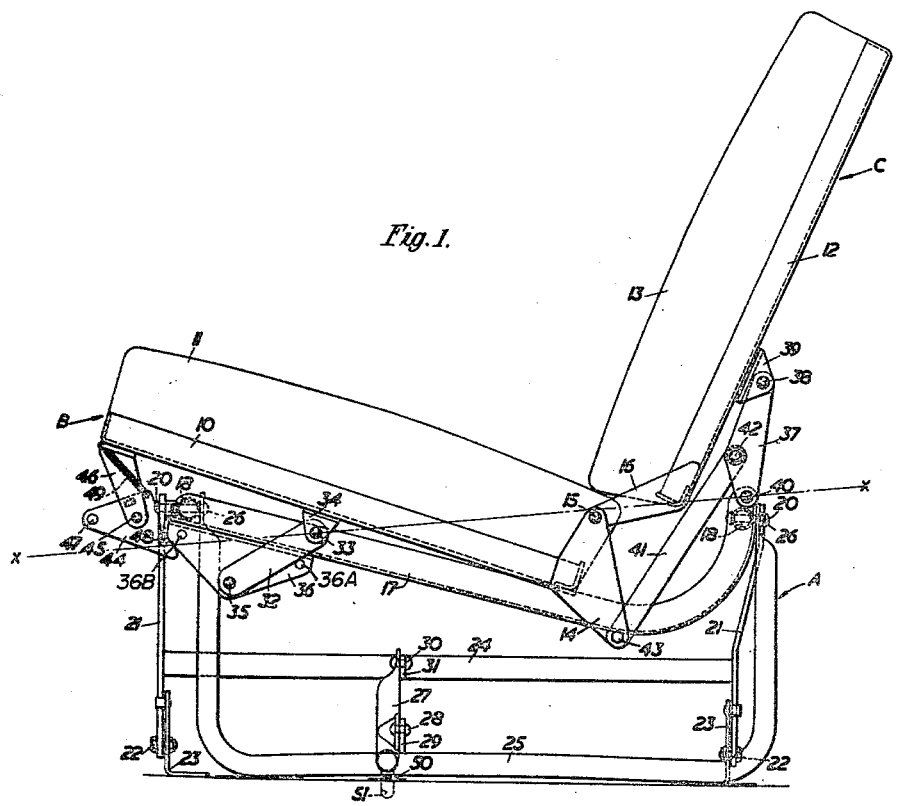
FIG. 1 is a side elevation of the seat unit showing it in the seating position.

The seat unit is shown installed as one of the rear seats in a vehicle. It is capable not only of conversion from a seat to a bed, but also of lateral movement in relation to the vehicle to bring it into abutment with a companion rear seat to form a bed, and also of being folded upwardly against the side wall of the vehicle.

The seat unit includes a base frame A, a seat frame B and a back frame C. The seat frame B includes a rectangular metal framework 10 supporting a squab 11 and the back frame C includes a similar metal framework 12 supporting a squab 13. The seat frame B carries, at each side, a bracket 14 hinged at 15 to a bracket 16 on the back frame C.

The base frame A includes side members 17 joined at their ends by fore and aft tubes 18. At their ends nearer the wall 19 (FIG. 4) of the vehicle, the tubes 18 are pivoted, at 20 to the upper ends of arms 21 which, in turn, are pivoted at their lower ends 22 to brackets 23 fixed to the floor of the vehicle. The arms 21 are connected by a tube 24. The base frame A also includes a U-shaped leg 25 which rests on the floor of the vehicle and is pivoted at its upper ends 26 to the tubes 18. A curved link 27 is pivoted at one end 28 to an arm 29 fixed to the leg 25 and at the other end 30 to an arm 31 fixed to the tube 24.

The framework 10 of the seat frame is connected at each side to the base frame by a link 32, pivoted at its upper end 33 to a bracket 34 on the seat frame and at its lower end 35 to a bracket 36 on the side member 17 of the base frame. The framework 12 of the back frame is connected at each side to the base frame by a link 37, pivoted at its upper end 38 to a bracket 39 on the back frame and at its lower end 40 to the side member 17 of the base frame. At each side of the seat unit there is provided a control link 41, pivoted at one end 42 to the link 37 and at the other end 43 to the bracket 14.

The seat unit is retained in the seating position shown in FIG. 1 by engagement of catches 44, pivoted at 45 on brackets 46 extending downwardly from the framework 10 on each side thereof and joined by a rod 47, with flanges 48 extending downwardly from the side members 17 of the base frame. The catches are held in such engagement by springs 49, but by rocking them about the pivots 45 against the action of the springs they may be freed to permit the front end of the seat frame B to be moved forwardly and downwardly to shift the parts from the position of FIG. 1 to that of FIG. 2. As will be seen, this involves rocking of the links 32 counterclockwise about the centres 35, oppositely directed pivotal movements of the seat and back frames about the centres 15, counterclockwise rocking movement of the links 37 about the centres 40 and upward and forward movement of the control links 41. The seat unit can be restored to the position of FIG. 1 by lifting the rear end of the back frame C, and will be automatically locked in the seating position by re-engagement of the catches 44.

Figure 2:
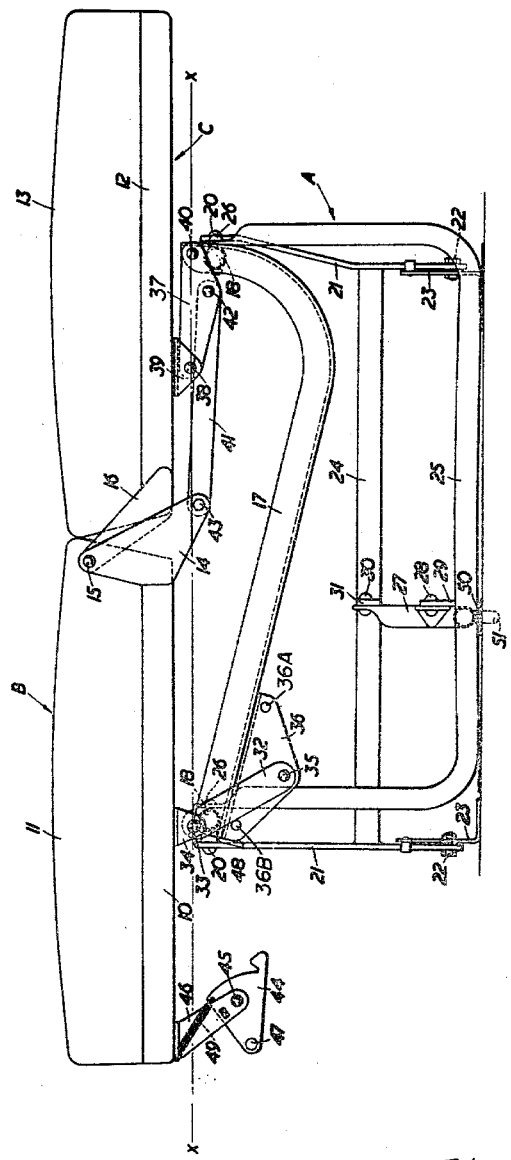
FIG. 2 is a similar view, showing the seat unit in the flat position.

The seat unit can be stowed against the side 19 of the vehicle, from the flat position of FIG. 2, as shown in chain dotted lines in FIG. 4. This is effected by rotating the sub-frame formed by the side members 17 and tubes 18 through 90° about the centres 20.

Figure 3:
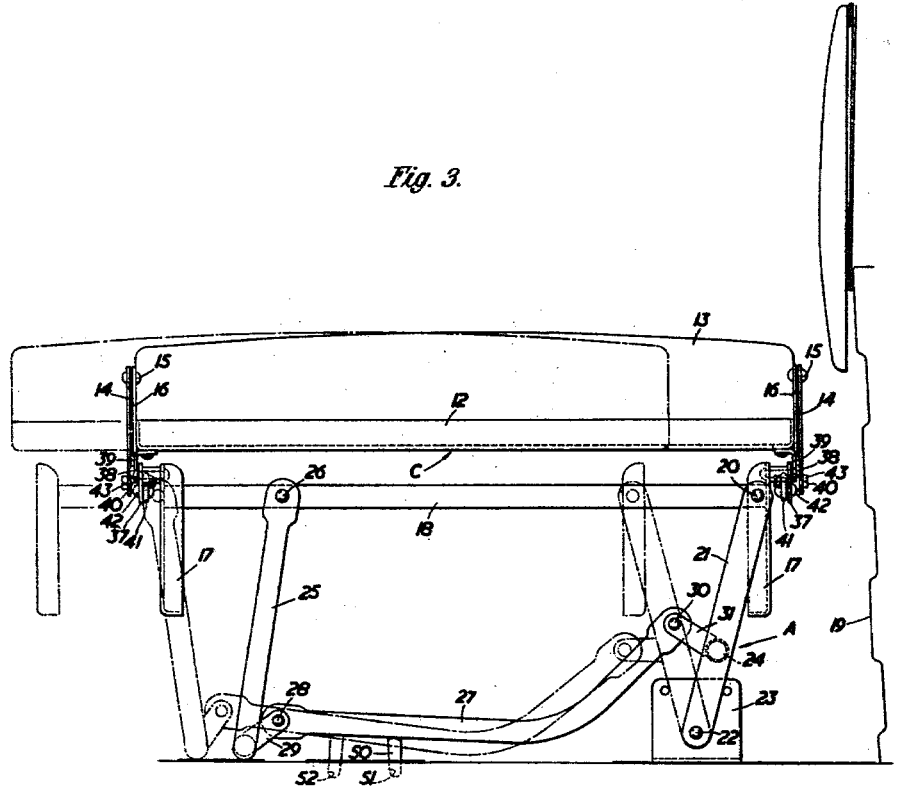

The base frame A may be moved inwardly from the side of the vehicle into the position shown in chain-dotted lines in FIG. 3, as described in my copending United States application Serial No. 125,225, filed July 19, 1961, now abandoned, by lifting a pin 50 on the link 27 from a socket 51 in the floor and inserting it into another socket 52 in the floor. This movement is accompanied by counterclockwise rocking of the arms 21 about the centres 22 and movement of the leg 25 and the curved link 27 into the alternative positions shown in FIG. 3.

It will be noted that in the seating position (FIG. 1) the link 32 abuts against a stop 36A at the rear end of the bracket 36 while in the flat position (FIG. 2) the link 32 abuts against stop 36B at the front end of the bracket 36 and the control link 41 extends substantially horizontally, and that the link 37 extends vertically in the seating position (FIG. 1) and horizontally in the flat position (FIG. 2). Stability of the seat unit in both its positions is assured by the fact that the hinge 15 is below the line XX joining the centres 33, 40 in the position of FIG. 1 and the centres 43, 42 at both ends of the link 41 lie below said line XX in the position of FIG. 2.

It is important that a seat unit installed in a motor vehicle should not change its configuration, when unoccupied, as the result of vibration and forces imparted to it by the movement of the vehicle. This is ensured in the seating position (FIG. 1) because the sum of the distances between the centre 33 and the centre 15 and between the centre 15 and the centre 40 slightly exceeds the distance between the centres 33 and 40 measured along the line XX. In the flat position (FIG. 2) the sum of the distances between the centre 33 and the centre 43 and between the centre 43 and the centre 40 is also slightly greater than the distance between the centres 33 and 40 measured along the line XX. The seat unit is further stabilized in the position of FIG. 2 by reason of the abutment at each side of the seat unit of the pivot pin 38 upon the upper surface of the link 41.

What I claim as my invention and desire to secure by Letters Patent is:

1. A seat unit comprising a base frame, a seat frame, a back frame, a hinge connecting the forward end of the back frame to the rear end of the seat frame, and linkages connecting the seat frame and the back frame to the base frame at each side of the seat unit and permitting of conjoint movement of the seat frame and back frame in relation to said base frame from a seating position in which they collectively form a seat to a flat position in which they are aligned and extend substantially horizontally, each of said linkages comprising a first link pivoted at one end to the base frame and at the other end to the back frame, a second link pivoted at one end to the rear end of the seat frame and at its other end to a point intermediate in the length of said first link and a third link having a lower end pivoted to the base frame and an upper end pivoted to the seat frame, said hinge being disposed in the seating position of the seat unit below the line joining the pivot at the upper end of the third link and the pivot connecting the first link to the base frame and said second link extending substantially horizontally in the flat position of the seat unit and with the pivots at its opposite ends below said line.

2. A seat unit as claimed in claim 1, wherein said base frame includes abutments which contact respectively with the third link of one of said linkages in the seating and flat positions of said seat unit.

3. A seat unit as claimed in claim 1, wherein in each linkage the first link is pivoted at its said other end to the back frame by a pin adapted to rest on the upper surface of the second link in the flat position of said seat unit.

4. In a vehicle having walls and a floor, the combination of a seat unit comprising a base frame, a seat frame, a back frame hinged at its forward end to the seat frame, linkage means connecting the seat frame and the back frame to the base frame and permitting of conjoint movement of the seat frame and back frame in relation to said base frame from a seating position in which they collectively form a seat to a flat position in which they are aligned and extend substantially horizontally, said base frame including an upper member supporting said linkage means, an arm located adjacent a wall of the vehicle and pivoted at its upper end to said upper member and at its lower end to the floor, a leg spaced inwardly from said arm, said leg being pivoted at its upper end to said upper member and resting at its lower end on the floor, a link extending transversely of said vehicle and pivoted at its opposite ends to said arm and said leg and a pin extending downwardly from said link, said floor having sockets spaced at different distances from said wall and alternatively engageable by said pin to locate said seat unit in different laterally spaced positions in the vehicle.

5. In a vehicle having walls and a floor, a seat unit comprising a base frame including a lower portion fixed to the floor of the vehicle and an upper portion, a seat frame, a back frame, a hinge connecting the forward end of the back fram to the rear end of the seat frame, and linkages connecting the seat frame and the back frame to the upper portion of the base frame at each side of the seat unit and permitting of conjoint movement of the seat frame and back frame in relation to said base frame from a seating position in which they collectively form a seat to a flat position in which they are aligned and extend substantially horizontally, each of said linkages comprising a first link pivoted at one end to the base frame and at the other end to the back frame, a second link pivoted at one end to the rear end of the seat frame and at its other end to a point intermediate in the length of said first link and a third link having a lower end pivoted to the base frame and an upper end pivoted to the seat frame, said hinge being disposed in the seating position of the seat unit below the line joining the pivot at the upper end of the third link and the pivot connecting the first link to the base frame and said second link extending substantially horizontally in the flat position of the seat unit and with the pivots at its opposite ends below said line, and a hinge adjacent to and parallel to the wall of the vehicle, said hinge permitting of upward movement in relation to said lower portion of said upper portion, with the seat frame and base frame, to stow them against said wall.

6. In a vehicle having walls and a floor, a seat unit comprising a base frame including a lower portion fixed to the floor of the vehicle and an upper portion, a seat frame, a back frame, a hinge connecting the forward end of the back frame to the rear end of the seat frame, and linkages connecting the seat frame and the back frame to the upper portion of the base frame at each side of the seat unit and permitting of conjoint movement of the seat frame and back frame in relation to said base frame from a seating position in which they collectively form a seat to a flat position in which they are aligned and extend substantially horizontally, each of said linkages comprising a first link pivoted at one end to the base frame and at the other end to the back frame, a second link pivoted at one end to the rear end of the seat frame and at its other end to a point intermediate in the length of said first link and a third link having a lower end pivoted to the base frame and an upper end pivoted to the seat frame, said hinge being disposed in the seating position of the seat unit below the line joining the pivot at the upper end of the third link and the pivot connecting the first link to the base frame and said second link extending substantially horizontally in the flat position of the seat unit and with the pivots at its opposite ends below said line, said base frame including an arm located adjacent a wall of the vehicle and pivoted at its upper end to said upper member and at its lower end to the floor, a leg spaced inwardly from said arm, said leg being pivoted at its upper end to said upper member and resting at its lower end on the floor, a link extending transversely of said vehicle and pivoted at its opposite ends to said arm and said leg and a pin extending downwardly from said link, said floor having sockets spaced at different distances from said wall and alternatively engageable by said pin to locate said seat unit in different laterally spaced positions in the vehicle.

References Cited by the Examiner

UNITED STATES PATENTS

| 1,064,306 | 6/13 | Fisher | 5—47 |
| 1,234,267 | 7/17 | Bennett | 297—335 X |

(Other references on following page)

| | | UNITED STATES PATENTS | | | | FOREIGN PATENTS | |
|---|---|---|---|---|---|---|---|
| 1,540,160 | 6/25 | Caldemeyer | 5—22 | 1,092,485 | 11/54 | France. | |
| 2,209,880 | 7/40 | Fox | 5—47 | 1,093,873 | 5/55 | France. | |
| 2,221,268 | 11/40 | Sears | 297—322 X | 1,191,159 | 4/59 | France. | |
| 2,335,036 | 11/43 | Young | 5—47 | 297,648 | 9/28 | Great Britain. | |
| 2,629,425 | 2/53 | James | 297—322 X | | | | |
| 2,859,798 | 11/58 | Carte | 5—37 | | | | |

FRANK B. SHERRY, *Primary Examiner.*